US009380248B1

United States Patent
Wisniewski et al.

(10) Patent No.: US 9,380,248 B1
(45) Date of Patent: *Jun. 28, 2016

(54) REMOTE CONTROL SYSTEM

(75) Inventors: John Wisniewski, Plymouth Meeting, PA (US); Kristopher Young, Atlanta, GA (US); David Wright, San Diego, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/243,987

(22) Filed: Sep. 23, 2011

Related U.S. Application Data

(63) Continuation of application No. 11/344,745, filed on Jan. 31, 2006, now Pat. No. 8,031,270.

(51) Int. Cl.
*H04N 5/44* (2011.01)
*H04N 21/422* (2011.01)

(52) U.S. Cl.
CPC ........ *H04N 5/4403* (2013.01); *H04N 21/42207* (2013.01); *H04N 21/42225* (2013.01); *H04N 21/42226* (2013.01)

(58) Field of Classification Search
CPC .. H04N 5/4403; H04N 5/44582; H04N 21/47
USPC .............................. 348/734; 340/12.25, 12.26
See application file for complete search history.

(56) References Cited

U.S. PATENT DOCUMENTS

| 5,614,906 | A  | * | 3/1997  | Hayes et al. | ........... | 341/176 |
| 2002/0140855 | A1 |   | 10/2002 | Hayes et al. |            |         |
| 2003/0103088 | A1 | * | 6/2003  | Dresti et al. | ........... | 345/835 |
| 2004/0041712 | A1 |   | 3/2004  | Collovini et al. |        |         |

OTHER PUBLICATIONS

USPTO Advisory Action for U.S. Appl. No. 11/344,745 dated Apr. 11, 2011; 2 pages.
USPTO Final Rejection for U.S. Appl. No. 11/344,745 dated Feb. 2, 2011; 6 pages.
USPTO Final Rejection for U.S. Appl. No. 11/344,745 dated May 18, 2010; 5 pages.
USPTO Non-Final Rejection for U.S. Appl. No. 11/344,745 dated Nov. 9, 2009; 4 pages.
USPTO Notice of Allowance for U.S. Appl. No. 11/344,745 dated May 26, 2011; 5 pages.

* cited by examiner

*Primary Examiner* — Michael Lee

(57) ABSTRACT

An example system includes a remote control and a host device. The remote control is configured to communication through a first communication interface and a second communication interface. The host device is configured to retrieve command information from a remote computer through a third communication interface, and responsive to one or more requests from the remote control, to transfer the command information to the remote control through the first communication interface, the remote control configured to control a plurality of remote devices through the second communication interface, using the command information.

20 Claims, 3 Drawing Sheets

REMOTE CONTROL SYSTEM

This application is continuation of U.S. patent application Ser. No. 11/344,745, filed Jan. 31, 2006, now U.S. Pat. No. 8,031,271, issued Oct. 4, 2011, which is incorporated by reference in its entirety herein.

TECHNICAL FIELD

The invention relates generally to remote controls and, in particular, to a dual mode infrared and radio frequency remote control system.

BACKGROUND OF THE INVENTION

Traditional remote control devices for Audio/Visual (AV) devices, such as televisions (TVs), receivers, tuners, amplifiers, video cassette recorders (VCRs), digital video disc (DVD) players, etc., use infrared (IR) light to communicate simple commands to the devices being controlled. There are few standards for remote control IR signaling, modulation, or protocols, and those standards that do exist are not widely used. As a result, separate remote controls may be required for the TV, VCR, DVD player, receiver, and Set-Top Box (STB) found in a typical living or family room. This is clearly cumbersome and results in an organizational nightmare and clutter—in this case, for example, five separate remote controls which can be lost, misplaced, or broken and render one or more A/V devices disabled.

In an attempt to ameliorate this situation, "universal" and "learning" remote controls have been developed. A number of suppliers have researched the IR signaling, modulation, protocols, and commands used by almost every AV product made in recent years and created a compressed format for storing all of the IR information in a database. A universal remote control stores the entire database (or perhaps a subset representing the most common AV devices in a particular market) of IR information and allows the user to program the universal remote control to control all the AV devices in a room. A simple remote control designed to control only one specific AV product can be implemented using a very low cost 4- or 8-bit microcontroller unit (MCU) with as little as one kilobyte (1 kB) of read-only memory (ROM). A universal remote control, however, requires an MCU with 24-48 kB of ROM, depending on how comprehensive the library is. This substantially increases the cost of the universal remote control.

A learning remote control takes a different approach. Rather than storing an entire database of codes, a learning remote control has an IR receiver. The learning remote control can receive the IR signals sent by another IR remote control. Thus, the learning remote control can be programmed to "learn" the IR commands sent by another IR remote control and control any or all of the AV devices in a system controlled by another IR remote control.

In practice, many universal remote controls also include a learning feature. These universal remote controls typically include a subset of the full code library to allow programming the most common devices; less common devices can be controlled using the learning feature of the universal remote control.

One very significant drawback of both universal and learning remote controls is the difficulty of programming them. Hence, a user must generally refer to an instruction manual for programming instructions. Although a remote control has many buttons, the most commonly available method of user feedback is a single light-emitting diode (LED). A typical programming sequence for a universal remote control comprises the following steps:

1. The user presses "1" or a device mode button for several seconds. Typically, a universal remote control includes a plurality of device mode buttons (e.g., CABLE, TV, VCR and OTHER) corresponding to the different AV devices to be controlled. To program the universal remote control to control a TV, for example, the user presses the TV button on the remote control.
2. The LED starts blinking to indicate programming mode.
3. To determine the IR code required to program the universal remote control to control the user's TV, the user refers to a large IR code table of AV Products in the instruction manual. The IR code table, often comprising many pages, provides a listing of TV (and other AV devices) manufacturers, model numbers, and a 3- to 6-digit number.
4. The user enters the 3- to 6-digit number.
5. The user repeats steps (1)-(4) for each AV device to be controlled by the universal remote control.
6. The user presses "1" or the device mode button again for several seconds.
7. The LED stops blinking to indicate that programming is complete.

Programming a learning remote control is even more complex. The procedure for entering learning mode typically comprises steps similar to those described above for entering programming mode. The user must generally position the remote control being learned from (the "teaching" remote control) in front of the remote control being taught (the learning remote control) so that the teaching remote control's IR transmitter is directly facing the learning remote control's IR receiver. The user then presses the VOLUME UP button, for example, on the learning remote control, followed by pressing the VOLUME UP button on the teaching remote control. When the learning remote control has received the signals from the teaching remote control, the LED on the learning remote control may blink to indicate to the user that the learning operation for that button has been completed. This process is then repeated for every button that is to be learned. In some cases, if the learning remote control supports multiple AV devices on the same button (e.g., the same PLAY button supports either a DVD or a VCR), then the whole process will be repeated for each AV device in the system, so that the PLAY button will issue a different IR signal depending on whether the DVD or the VCR is selected.

Clearly, these programming processes are not user-friendly. They are time consuming, confusing, and rely on having the instruction manual in hand. As a result, many users do not bother to program their universal remote controls; and many of those who bother, program only a few main features (e.g., PLAY, STOP, VOLUME UP, ENTER CHANNEL) rather than the full control set for every device.

IR is far from an ideal means of controlling AV devices. A positive feature of IR is its very low cost. However, one drawback is that IR requires line of sight between the remote control and the device being controlled. Thus, an IR remote control cannot be used to control devices inside a cabinet with a closed non-glass door. It also places limitations on the positioning of the user's furniture relative to the sitting/viewing position and the location of the equipment, as IR requires that there be no obstruction between the remote control and the device being controlled. Many IR remotes also have distance limitations such that you often cannot control things from across a large room. Another drawback is that IR requires large batteries, as the IR LED used to transmit is typically driven with up to 1 A of current. In addition, the data rate is very slow—so slow that even button presses (a few Hz at most) incur a noticeable delay if a number of the button presses are sent consecutively, for example, when pressing VOLUME UP, VOLUME UP, . . . , VOLUME UP to increase the volume to a desired level.

A radio frequency (RF) remote control would be desirable. No line of sight would be required, a greater distance could be covered, much smaller batteries could be used, and more interactive features could be supported (for example, a mouse-like cursor control feature for more sophisticated AV applications). For these reasons and others, RF remote controls have begun to increase in popularity. However, one disadvantage of an RF remote control is that it cannot be a "universal" or "learning" remote control.

Today, the most common RF remote controls are supplied with Cable, Satellite, Digital Terrestrial or Internet Protocol TV (IPTV) Set-Top Boxes. Many STB suppliers would like to offer dual mode RF and IR remote controls, allowing users to have "the best of both worlds." Such dual mode remote controls conventionally have been prohibitively expensive, when the only low cost (less than $1) RF technologies were very simple one-way systems using unlicensed RF bands such as 49 and 433 MHz. These RF technologies were very low data rate (typically, less than 10 kbps) and were not available worldwide, but had relatively good range. More recently, the worldwide adoption of a 2.4 GHz unlicensed band has encouraged the development of a number of very low cost, two-way, highly integrated radio integrated circuits (ICs), which offer medium range and support data rates of up to 1 Mbps.

Thus, a low-cost dual mode IR and RF remote control that greatly simplifies programming the "learning" and "universal" capabilities is desirable.

SUMMARY OF THE INVENTION

An improved remote control system preferably comprises a remote control capable of controlling a plurality of devices using a first communication link, for example, an infrared (IR) link. A host device is also preferably provided to configure the remote control. The host device is preferably configured to transmit data to and receive data from the remote control using a second communications link, for example, a radio frequency (RF) link. In operation, the remote control can receive command information from the host device. The command information preferably includes control codes and signaling protocols used by remotely controlled devices in the market. The command information may be stored in memory in the host device, or the host device may retrieve the command information from a remote database. The host device may also comprise a receiver to receive signals from remote control transmitters supplied with the devices to be controlled by the improved remote control.

BRIEF DESCRIPTION OF THE DRAWINGS

The above and other features and advantages of embodiments of the invention will become readily apparent by reference to the following detailed description when considered in conjunction with the accompanying drawings.

DETAILED DESCRIPTION

As will be apparent to those skilled in the art from the following disclosure, the invention as described herein may be embodied in many different forms and should not be construed as limited to the specific embodiments set forth herein. Rather, these embodiments are provided so that this disclosure will fully convey the principles and scope of the invention to those skilled in the art.

Figure 1:
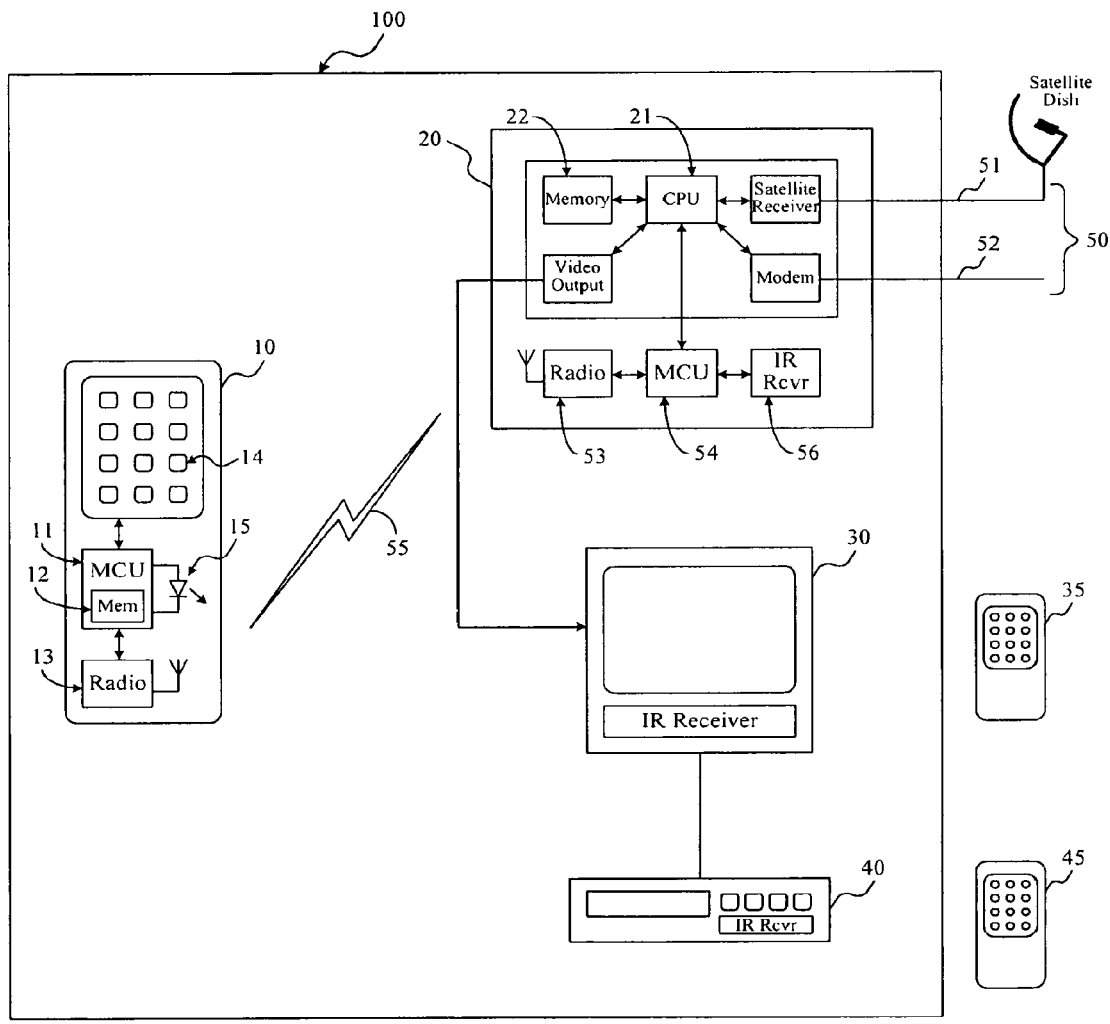
FIG. 1 shows an exemplary embodiment of a remote control system.

FIG. 1 shows one embodiment of an improved remote control system 100. The remote control system 100 preferably comprises a Remote Control 10, a host device 20 with a two-way communications link 50 to transmit and receive signals from an external source, and one or more Audio/Visual (AV) devices which may be controlled by an IR remote control 35, 45 supplied with the AV devices. The remotely controlled AV devices may include a TV 30, a DVD player 40, and/or other devices such as a receiver, a VCR, etc. The two-way communications link 50 may be a single bidirectional link, such as an Internet connection or a digital cable TV connection, or two unrelated communications paths, such as a satellite receiver link 51 and a telephone line 52.

In the embodiment shown in FIG. 1, the Remote Control 10 is preferably a remote control device supplied with the host device 20. The Remote Control 10 may be a remote control supplied with a Set-Top Box (STB), for example, a satellite, cable, or Internet Protocol TV (IPTV) STB. In other embodiments, the Remote Control 10 may also be implemented in remote control devices supplied with AV devices or other devices with an IR remote control such as ceiling fans, blinds, or light fixtures.

The Remote Control 10 preferably comprises a processing element 11, a memory 12, a bidirectional wireless communication device 13, a plurality of buttons 14, and an IR transmitter 15. The processing element 11 may be implemented in a microcontroller unit (MCU). The memory 12 may include Random Access Memory (RAM), Flash memory, Electrically Erasable Programmable Read Only Memory (EEPROM), hard disk drive, and/or other memory devices. In the embodiment shown in FIG. 1, the bidirectional wireless communications device 13 includes a radio transceiver, allowing the Remote Control 10 to communicate with the host device 20 using a bidirectional RF link 55. However, the bidirectional link 55 may include any two-way communications link, including IR, ultrasonic, or even a wired connection, for instance.

The host device 20 of the remote control system 100 preferably provides a main function in addition to programming the Remote Control 10. For example, the host device 20 in FIG. 1 comprises a Set-Top Box (STB) for receiving television signals, decoding the signals, and outputting video signals to the TV 30. The host device 20 includes a central processing unit (CPU) 21 and rewritable non-volatile data storage means 22. The storage means 22 provides program storage for the CPU and may include Flash memory, EEPROM, or a hard disk drive. The storage means 22 may also contain an IR remote control code library. The host device 20 preferably further includes the bidirectional data link 55 to the Remote Control 10. The data link 55 may be implemented in the host device 20 using a transceiver 53 and a processing element 54 dedicated to managing the bidirectional data link 55, with the processing element 54 exchanging data with the CPU 21. In another embodiment, the data link 55 may be implemented using a transceiver 53 controlled by the CPU 21. Optionally, the host device 20 may also comprise an IR receiver 56.

As supplied ("out of the box"), the Remote Control 10 and the STB 20 can be configured such that when a button 14 is pressed on the Remote Control 10, the Remote Control 10 sends RF commands to the STB 20. For example, pressing the 1, 2, and 3 buttons on the Remote Control 10 preferably causes the MCU 11 in the Remote Control 10 to send one or more RF packets to the STB 20, which then causes the STB 20 to tune to channel 123 and output a video signal to the TV 30. The TV 30 then displays the television station that corresponds to channel 123 on the Satellite, Cable, or IPTV system.

Figure 2:
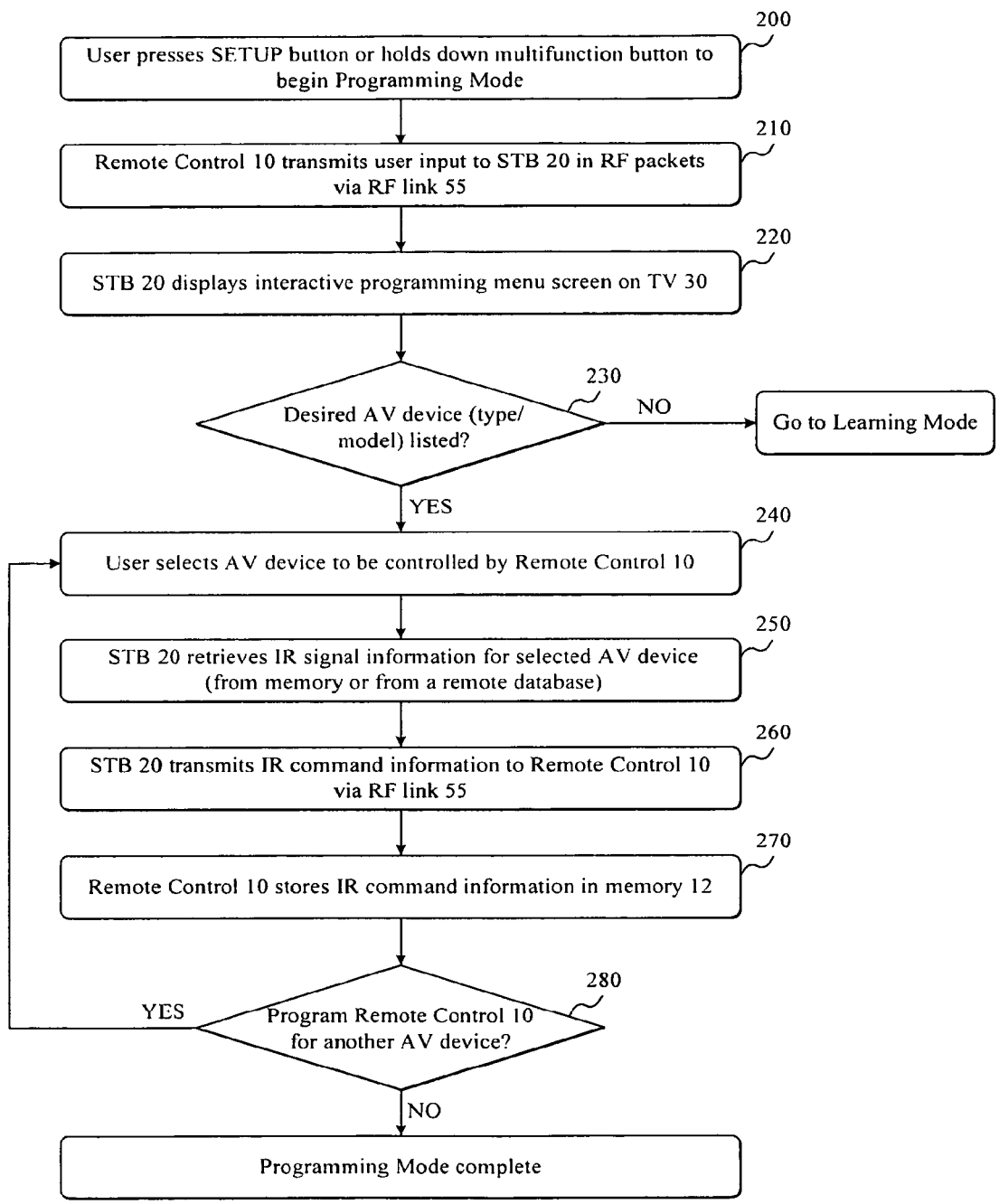
FIG. 2 shows a flowchart of the programming operation for the remote control system in FIG. 1.

FIG. 2 shows in flowchart form an embodiment of a programming operation of the remote control system 100 in FIG. 1. In this embodiment, a user may configure the Remote Control 10 to control an AV device using the AV device's IR remote control signals. In block 200, the user presses either a specific SETUP button on the Remote Control 10, or the user holds down a multifunction button for an extended time (for example, 5 seconds). In block 210, the Remote Control 10 then sends one or more RF packets to the STB 20 indicating that the user wishes to program the Remote Control 10. In block 220, the STB 20 then displays an interactive programming menu screen on the TV 30 or other display, such as a display integral with the Remote Control 10. In one embodiment, the menu screen may contain instructions and a list of device types. The list of device types may include TV, VCR, DVD player, CD player, Receiver, Tuner, PVR, etc.

For example, to configure the Remote Control 10 to control the TV 30, the user selects the TV option from the menu list using the UP and DOWN arrow buttons and then presses the ENTER button on the Remote Control 10. The STB 20 then displays a menu list of TV vendors—for example, Sony, Panasonic, BenQ, etc.—preferably including an OTHER and/or MORE OPTIONS menu options. If, in block 230, the TV 30 is made by one of the vendors on the list, the user would select that vendor from the menu in block 240. The STB 20 would then display a list of TV models from that vendor. The list of models may be formatted, for example, as a single long list of models or as a tiered menu list. In a tiered menu list, a first tier list may appear as a list of TV screen sizes, for example, "22-inch, 22-inch—27-inch, 27-inch, etc.," followed by a sub-menu list of TV model numbers for each of the options provided in the first tier. When the user selects the TV model number from the menu, in block 250, the STB 20 then retrieves the details of the IR signals required to be transmitted for each function in order to control the TV 30. In block 260, the STB 20 then sends the IR command information to the Remote Control 10 via the RF link 55. In block 270, the Remote Control 10 then stores the IR command information in memory 12.

Thereafter, when the user presses the TV button on the Remote Control 10, any subsequent button presses causes the MCU 11 in the Remote Control 10 to access the IR command information stored in memory 12 and send the appropriate signals using the IR transmitter 15 in the Remote Control 10. For example, if the user presses the TV button followed by the VOLUME UP button, the MCU 11 finds the IR command information in memory 12 corresponding to "increment volume" and sends that IR command. Thus, the Remote Control 10 will send IR signals to the TV 30 that are functionally equivalent to the IR signals that would be transmitted by the remote control 35 originally supplied with the TV 30 when the VOLUME UP button was pressed on the remote control 35.

In block 280, the user may then continue programming the Remote Control 10 to control other AV devices, for example, a DVD player 40, by means of the interactive menu system on the STB 20.

Figure 3:
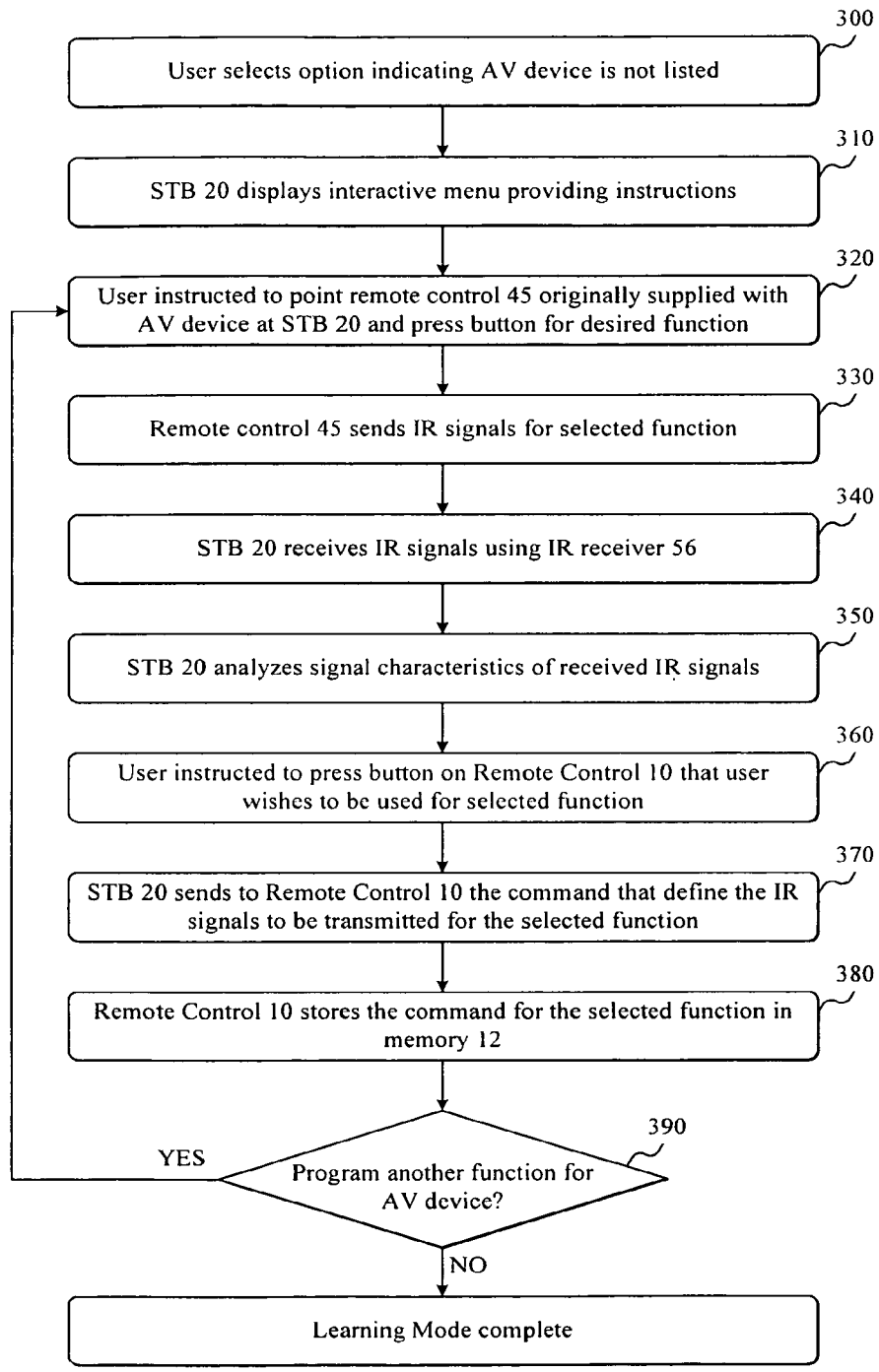
FIG. 3 shows a flowchart of the learning mode operation of the remote control system in FIG. 1.

FIG. 3 shows a flowchart of the learning mode operation of the remote control system 100 in FIG. 1. In some cases, the database stored in the STB 20 may not include the IR command information for the AV device that the user wishes to program. For example, the user may want to configure the Remote Control 10 to control the DVD player 40. If the DVD player 40 is not included in the menu list (FIG. 2, block 230), then the remote control system 100 enters the learning mode and provides instructions to "teach" the Remote Control 10 to control the DVD player 40. In block 300, the user selects an option labeled, for example, "My DVD player is not listed." In block 310, the STB 20 then takes the user to another interactive menu system to access the "learning" functions of the remote control system 100. The STB 20 displays instructions on the TV 30 guiding the user through the learning process. For example, the user may want to teach the Remote Control 10 to control the FFWD function of the DVD player 40. In block 320, the user receives instructions to point the remote control 45 originally supplied with the DVD player 40 at the STB 20 and press the FFWD button on that remote control 45. This causes, in block 330, the DVD player remote control 45 to send the IR signals that the DVD player 40 interprets to mean "Fast Forward." In block 340, the STB 20 receives the IR signals using the IR receiver 56. In block 350, the STB 20 then analyzes the IR signals to determine the signal characteristics including the carrier frequency, the type of modulation (On/Off Key modulation, Pulse Width Modulation, etc.), and the underlying data encoded in the transmission. In block 360, the STB 20 then displays instructions on the TV 30 instructing the user to press the button on the Remote Control 10 that the user wishes to be used to send the FFWD command to the DVD player 40. In block 370, the STB 20 then sends to the Remote Control 10, via the RF data link 55, the command that defines the IR signals to be transmitted by the Remote Control 10 to control the FFWD function in the DVD player 40. In block 380, the MCU 11 in the Remote Control 10 stores the command in memory 12. In block 390, the STB 20 displays further instructions on the TV 30, asking the user if "learning" is complete or if another button on the Remote Control 10 is to be programmed. This "teaching" process continues until the user has programmed all of the DVD player functions that the user wishes to control using the Remote Control 10.

According to further principles of the invention, the remote control system 100 preferably permits online updating of the IR signal/code library. Referring back to FIG. 1, the host device 20 (the STB) preferably includes a two-way communications link 50 to transmit and receive signals from an external source. Using the communications link 50, the STB 20 may communicate with a remote computer comprising a master library of the IR signals/codes. The STB 20 may then periodically receive updates to the IR signal/code library stored in memory 22 from the remote computer each time the master library is updated to support new devices or may access this database upon receiving a "My DVD (or similar) not listed." Thus, if the user buys a new AV component only recently brought to market, the library stored in memory 22 of the STB 20 may be updated to support that new AV component. The user will be able to take full advantage of the "universal" Remote Control 10 that would not have been possible with the conventional solution.

In yet another aspect of the invention, the remote control system 100 may provide an improved method of performing firmware updates. Unfortunately, early releases of many consumer electronic products incorporating a processing element and firmware and/or software typically have a "bug" in that firmware. Due to the complexity of the firmware and/or the very wide variety of possible usage scenarios, it may be impractical to test every possible combination prior to bringing a product to market. Thus, firmware updates are a common occurrence. In the conventional solution, the STB manufacturer may ship a newer revision of the remote control incorporating the upgraded firmware to the user. This solution may be costly for the manufacturer and unsatisfactory for the user. The principles of the present invention offer an improved solution. Using the two-way communications link 50, an STB manufacturer may transmit firmware upgrades to the STB 20. Using the RF link 55, the revised firmware may then be uploaded from the STB 20 to the memory 12 of the Remote Control 10 either automatically or in response to a user action through a HELP menu displayed on the TV 30 by the STB 20.

As described above, the IR signal/code library may be stored in memory 22 on the STB 20. In another embodiment of the remote control system 100, the library is not stored in the STB 20. Rather, the library may be stored in a remote computer (not shown) and accessed by the STB 20 through the data link 50 only when the user programs the Remote Control 10. This embodiment may provide advantages for the owners of the library. Providing the entire library, which may represent valuable intellectual property (IP), in a product may leave the library open to "hacking" by an IP thief. Maintaining control over the library may provide the owners of the library a level of security. This embodiment may also provide an alternative business model for the owners of the IR signal/code library. For example, the owners of the library may charge the STB vendor a fee each time the database is accessed by the user. Thus, this business model may provide a constant stream of revenue for the owners of the library, rather than a one-time licensing fee. The STB vendor may also benefit from this business model, which may reduce the upfront cost of building an STB.

The system described above can use dedicated processor systems, microcontrollers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software. They may also be modified in structure, content, or organization without departing from the spirit and scope of the invention.

It should be appreciated that reference throughout this specification to "one embodiment" or "an embodiment" means that a particular feature, structure, or characteristic described in connection with the embodiment may be included in at least one embodiment of the invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined or separated as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, having described exemplary embodiments of the invention, it is noted that modifications and variations can be made by persons skilled in the art in light of the above teachings. Therefore, it is to be understood that changes may be made to embodiments of the invention disclosed that are nevertheless still within the scope and the spirit of the invention.

What is claimed is:

1. A system comprising:
   a remote control configured to transmit one or more radio frequency (RF) packets to a first communication interface; and
   a host device configured to transfer command information to the remote control through the first communication interface in response to the one or more RF packets including one or more requests from the remote control, the one or more requests identifying one or more devices, wherein the host device is configured to identify and select the command information including one or more command codes from a remote library based on the one or more devices identified by the one or more requests, the one or more command codes being specific to the one or more devices identified by the one or more requests, wherein the host device is configured to receive an input indicating that the command information specific to the one or more devices is not stored in the remote library, wherein the host device is further configured to generate the command information and transmit the command information to the remote control via the first communication interface responsive, at least in part, to receiving the input,
   wherein the remote control is configured to control a plurality of remote devices, using the command information, through a second communication interface, and wherein the host device is configured to retrieve the command information from a remote computer through a third communication interface prior to the transfer of the command information to the remote control through the first communication interface.

2. The system of claim 1, wherein the host device comprises a local memory to store the retrieved command information.

3. The system of claim 1, wherein the third communication interface includes a cable television interface.

4. The system of claim 1, wherein the host device is configured to update a firmware of the remote control through the first communication interface.

5. The system of claim 1, wherein the first communication interface comprises a radio frequency (RF) interface.

6. The system of claim 1, wherein the second communication interface comprises an infrared (IR) interface.

7. The system of claim 1, wherein the host device is configured to retrieve the command information from the remote computer responsive to the one or more requests from the remote control and wherein the command information comprises one or more command codes and signaling protocols used by the remote control to control the plurality of remote devices.

8. The system of claim 7, wherein the command information includes one or more infrared (IR) command codes and signaling protocols.

9. The system of claim 1, wherein the host device is configured to analyze signals received from a remote control transmitter associated with another remote device, generate further command information based on the analysis, and transfer the further command information to the remote control through the first communication interface, the remote control configured to control the further remote device through the second communication interface, using the further command information.

10. A method comprising:
    receiving, through a first communication link, one or more radio frequency (RF) packets including a selection of a device to be controlled by a remote control, the remote control to use command information to control the selected device through a second communication link;
    receiving an input identifying whether the command information is stored in a remote database;
    selecting, at a host device, the command information including one or more command codes from the remote database based on the selection of the device received from the remote control, the selecting being responsive to determining that the command information is stored in the remote database, the one or more command codes being associated with the device identified by the selection, and the selecting being responsive to the receiving of the one or more RF packets including the selection of the device, the command information being received from the remote database through a third communication link;
    generating the command information responsive to determining that the command information is not stored in the remote database;
    transferring the command information to the remote control using the first communication link;
    receiving, through the third communication link, an upgrade to a firmware of the remote control; and
    transferring the upgrade to the remote control over the first communication link.

11. The method of claim 10, wherein the receiving of the command information includes receiving the command information responsive to the selection of the device to be controlled by the remote control, wherein the command information comprises one or more command codes and signaling protocols used by the remote control to control the selected device.

12. The method of claim 11, further comprising receiving updates to the command information from the remote database and transferring the received updates to the command information to the remote control through the first communication link.

13. The method of claim 10, wherein the first communication link comprises a radio frequency (RF) link.

14. The method of claim 10, wherein the second communication link comprises an infrared (IR) link.

15. The method of claim 10, further comprising:
    determining further command information associated with another device to be controlled by the remote control, the determining of the further command information comprising:
        receiving signals from a remote control transmitter associated with the other device;
        analyzing characteristics of the signals; and
    transferring the further command information to the remote control through the first communication link.

16. The method of claim 15, wherein the receiving of the signals from the remote control transmitter is responsive to instructing a user to cause the remote control transmitter to transmit the signals.

17. The method of claim 15, wherein the determining of the further command information comprises generating the further command information based on the analyzed characteristics of the signal, the analyzed characteristics including at least one of a carrier frequency of the signals and a type of modulation of the signals.

18. A remote control comprising:
    a first communication interface to be communicatively coupled with a host, the first communication interface configured to wirelessly transmit one or more radio frequency (RF) packets including one or more requests from the remote control to the host to select from the host a first device to be remotely controlled, wirelessly receive a first command code from the host responsive to the selection, the first command code being selected and retrieved by the host from a remote library based on the selection of the first device and in response to the one or more RF packets, and in response to the host determining that the first command code is stored in the remote library, the first command code being generated and transmitted via the first communication interface by the host in response to the first command code not being stored in the remote library,
    the first command code being configured to remotely control the first device, wirelessly select from the host a second device to be remotely controlled, and wirelessly receive a second command code from the host responsive to the selection, the second command code being selected and retrieved by the host from the remote library based on the selection of the second device, the second command code being configured to remotely control the second device; and
    a second communication interface to be communicatively coupled with the first device and the second device, the second communication interface configured to wirelessly control the first remotely controlled device using the first command code, and wirelessly control the second remotely controlled device using the second command code.

19. The remote control of claim 18, wherein the first communication interface comprises a radio frequency (RF) transceiver.

20. The remote control of claim 18, wherein the second communication interface comprises an infrared (IR) transmitter.

* * * * *